(12) United States Patent
Koguchi et al.

(10) Patent No.: US 7,596,994 B2
(45) Date of Patent: Oct. 6, 2009

(54) DEVICE AND METHOD FOR INSPECTING CONNECTING ROD

(75) Inventors: Tsuguo Koguchi, Nasukarasuyama (JP); Hideki Okumura, Koga (JP)

(73) Assignee: Honda Motor Co., Ltd., Tokyo (JP)

( * ) Notice: Subject to any disclaimer, the term of this patent is extended or adjusted under 35 U.S.C. 154(b) by 394 days.

(21) Appl. No.: 11/579,942

(22) PCT Filed: Nov. 9, 2005

(86) PCT No.: PCT/JP2005/020551
§ 371 (c)(1), (2), (4) Date: Feb. 20, 2007

(87) PCT Pub. No.: WO2006/051822
PCT Pub. Date: May 18, 2006

(65) Prior Publication Data
US 2008/0307872 A1    Dec. 18, 2008

(30) Foreign Application Priority Data

| Nov. 9, 2004 | (JP) | ............................. 2004-325474 |
| Nov. 9, 2004 | (JP) | ............................. 2004-325479 |

(51) Int. Cl.
*G01M 15/02* (2006.01)
(52) U.S. Cl. ................................. 73/114.77
(58) Field of Classification Search ............ 73/114.77, 73/114.79, 114.81
See application file for complete search history.

(56) References Cited

U.S. PATENT DOCUMENTS

| 5,274,919 | A | * | 1/1994 | Becker ..................... 29/888.09 |
| 5,416,590 | A |   | 5/1995 | Stover et al. |
| 5,974,663 | A | * | 11/1999 | Ikeda et al. .............. 29/888.09 |
| 5,999,265 | A |   | 12/1999 | Dalancon et al. |
| 7,400,417 | B2 | * | 7/2008 | Foes .......................... 356/630 |
| 2002/0023939 | A1 | * | 2/2002 | Hase .............................. 225/2 |
| 2003/0019100 | A1 | * | 1/2003 | Hoffmann ................ 29/888.09 |
| 2004/0134957 | A1 | * | 7/2004 | Guirgis ........................... 225/1 |
| 2004/0250652 | A1 | * | 12/2004 | Amano et al. ................. 75/255 |
| 2005/0015982 | A1 | * | 1/2005 | Arnold ................... 29/888.092 |
| 2005/0126660 | A1 | * | 6/2005 | Kubota et al. ............... 148/210 |
| 2006/0138100 | A1 | * | 6/2006 | Bustamante et al. ... 219/121.62 |
| 2006/0289593 | A1 | * | 12/2006 | Guirgis ........................... 225/2 |
| 2007/0209629 | A1 | * | 9/2007 | Minemura et al. ....... 123/197.3 |
| 2007/0256300 | A1 | * | 11/2007 | Okumura et al. ......... 29/888.09 |

(Continued)

FOREIGN PATENT DOCUMENTS

JP    61-172006 A    8/1986

(Continued)

*Primary Examiner*—Eric S McCall
(74) *Attorney, Agent, or Firm*—Birch, Stewart, Kolasch & Birch, LLP (57) ABSTRACT

A connecting rod inspecting device is provided with a work table for placing a connecting rod in a status where the connecting rod is positioned at a prescribed position; a slide unit for reciprocating the work table along the horizontal direction; and first to fourth distance sensors for measuring a step quantity (D) of a step part by irradiating measuring planes composed of curved surfaces with laser beams and measuring distances between the sensors and the planes irradiated with the beams. Conforming/nonconforming judgment is made by the measured step quantity (D) and a range of allowable quantities previously set.

8 Claims, 10 Drawing Sheets

U.S. PATENT DOCUMENTS

2008/0011801 A1* 1/2008 Okumura et al. ................ 225/2
2008/0209708 A1* 9/2008 Kawamura et al. ......... 29/426.5

FOREIGN PATENT DOCUMENTS

| | | |
|---|---|---|
| JP | 3-103704 A | 4/1991 |
| JP | 5-118836 A | 5/1993 |
| JP | 5-285742 A | 11/1993 |
| JP | 11-15677 A | 6/1999 |
| JP | 2001-183113 A | 7/2001 |
| JP | 2003-315020 A | 11/2003 |
| JP | 2003-344022 A | 12/2003 |
| JP | 2004-245237 A | 9/2004 |

* cited by examiner

DEVICE AND METHOD FOR INSPECTING CONNECTING ROD

TECHNICAL FIELD

The present invention relates to an apparatus (device) for and method of inspecting a connecting rod as an engine component for motor vehicles, and more particularly to an apparatus for and method of inspecting a connecting rod by cracking a larger end of the connecting rod into a cap and a rod, rejoining the cap and the rod, and thereafter checking a step in a joint area between the cap and the rod.

BACKGROUND ART

Heretofore, connecting rods interconnecting piston pins and crank pins have widely been used in vehicular engines. Each of the connecting rods has a larger end coupled to the crankpin and a smaller end coupled to the piston pin. For manufacturing a connecting rod, it is generally customary to produce a one-piece connecting rod having a larger end and a smaller end by forging or the like, and thereafter to fracture the larger end into a cap and a rod.

The cap and the rod are rejoined by bolts into a connecting rod. After the connecting rod is inspected, it is assembled as an engine component in a vehicle engine. When the cap and the rod are rejoined together, if the joint area between the cap and the rod contains a step exceeding a predetermined tolerance, then the connecting rod is rejected as a nonconforming product.

Generally, there are known apparatus for inspecting a step surface with a laser beam. For example, Japanese Laid-Open Patent Publication No. 11-156577 discloses a butting position detecting apparatus for applying a laser beam obliquely from a slit laser oscillator to a step between workpieces WA, WB, detecting a reflected beam with a CCD line sensor, and detecting a butting position at the step between the workpieces WA, WB based on a change from a higher level to a lower level of the amount of light detected by the CCD line sensor.

Japanese Laid-Open Patent Publication No. 2001-183113 reveals a step detecting apparatus having an illuminating device for irradiating a certain area of an inspected object such as a letter or the like with a laser beam, a dichroic mirror, a CCD sensor, etc. The step detecting apparatus reads a step such as of a surface irregularity of the inspected object and performs predetermined image processing on the read data.

Japanese Laid-Open Patent Publication No. 2003-315020 discloses a portable beam-interruption measuring apparatus having a guide for contacting the surface of a measured object so as to serve as a support, the guide being positioned eccentrically with respect to a beam slit. The disclosed portable beam-interruption measuring apparatus is capable of avoiding an error which would be caused if the angle of the apparatus with respect to the measured object changes, and of measuring a gap and a step in the measured object while the slit beam is applied to the measured object at a constant angle and an image capturing device captures an image at a constant angle.

The apparatus disclosed in Japanese Laid-Open Patent Publications Nos. 11-156577, 2001-183113, and 2003-315020 are based on the assumption that the measured surfaces are flat and the step to be measured is provided by the flat surfaces. However, when the larger end of a connecting rod is fractured into a cap and a rod and then the cap and the rod are rejoined, a step provided in the joint area between the cap and the rod has a curved surface. The apparatus disclosed in the above publications is not suitable for use in inspecting the step in such a joint area between the cap and the rod because the apparatus tend to produce measurement errors.

Specifically, the apparatus disclosed in the above publications are designed to measure the extent of a step provided by flat or slanted surfaces. On the other hand, when the larger end of a connecting rod is fractured into a cap and a rod, the cap and the rod will shrink due to residual stresses produced after the fracture. Since the cap and the rod shrink, the joint area subsequently formed between the cracked surface of the cap and the cracked surface of the rod when the cap and the rod are rejoined includes a step having a curved surface. Various cracked connecting rods include steps having various differently shaped curved surfaces. The surface roughness of the measured surfaces needs to be taken into account. Another problem is that when the larger end of a connecting rod is fractured into a cap and a rod, the cap and the rod may possibly expand due to residual stresses produced after the fracture.

Consequently, if the apparatus disclosed in the above publications are applied to inspect the step in the joint area between the cap and the rod, then the step cannot be measured or the measured data contains a large error because the measured surface is not constant, but includes irregularities.

It is a general object of the present invention to provide an apparatus for accurately inspecting the extent of a step in the joint area of a connecting rod which is formed when a rod and a cap that are produced by fracturing the larger end of the connecting end are rejoined.

It is a main object of the present invention to provide a method of accurately inspecting the extent of a step in the joint area of a connecting rod which is formed when a rod and a cap that are produced by fracturing the larger end of the connecting end are rejoined.

BEST MODE FOR CARRYING OUT THE INVENTION

Figure 1A:
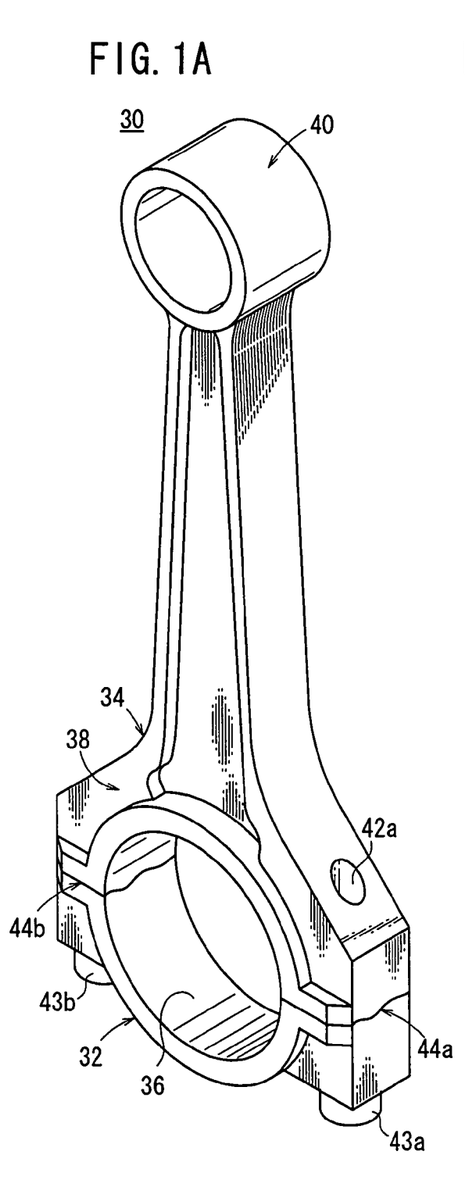
FIG. 1A is a perspective view of a connecting rod formed when a cap and a rod that are produced by fracturing the larger end of the connecting end are rejoined.
Figure 1B:
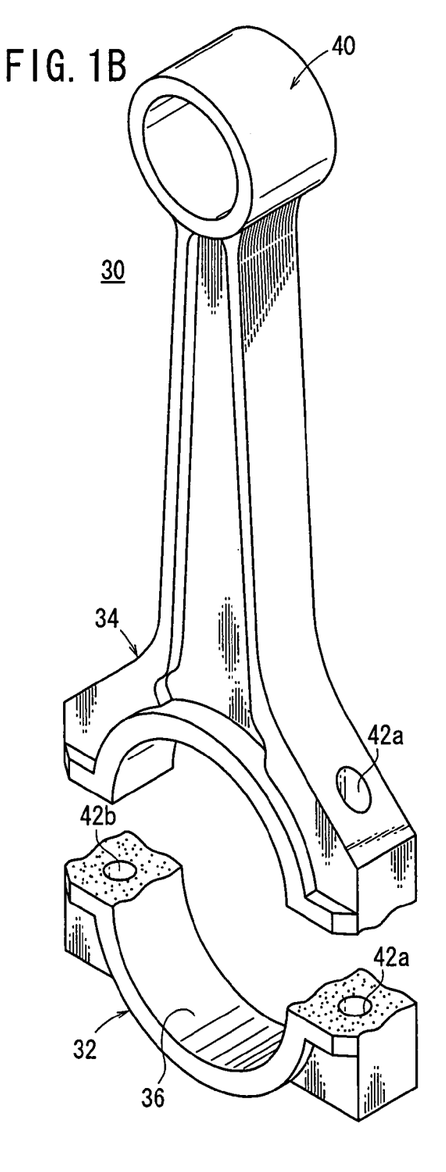
FIG. 1B is a perspective view of the connecting rod as it is fractured into the cap and the rod.

FIG. 1A shows in perspective a connecting rod 30 as an inspected workpiece, having a cap 32 and a rod 34 that have been fractured apart and rejoined to each other by bolts 43a, 43b. FIG. 1B shows in perspective the connecting rod 30 as it is fractured into the cap 32 and the rod 34.

As shown in FIGS. 1A and 1B, the connecting rod 30 has a larger end 38 comprising an integral structure of the cap 32 and the rod 34 with a substantially circular joint hole 36 defined therebetween, and a smaller end 40 positioned remotely from the larger end 38. After the connecting rod 30 is integrally produced by casting, forging, or the like, it is fractured into the cap 32 and the rod 34 by a cracking apparatus, not shown.

The larger end 38 has a pair of boltholes 42a, 42b defined in opposite sides thereof by a boring mechanism (not shown) such as a drill or the like. In a process of assembling an engine, bolts 43a, 43b are threaded from the cap 32 into the respective boltholes 42a, 42b, fastening the cap 32 to the rod 34. The fractured cap 32 is thus fastened to the rod 34 to connect the larger end 38 of the connecting rod 30 to a crank pin (not shown) of the engine.

In FIG. 1A, the larger end 38 has a pair of joint areas 44a, 44b where the fractured surface of the cap 32 and the fractured surface of the rod 34 are rejoined. The joint areas 44a, 44b are located in the opposite sides of the larger end 38 diametrically across the joint hole 36.

Figure 2:
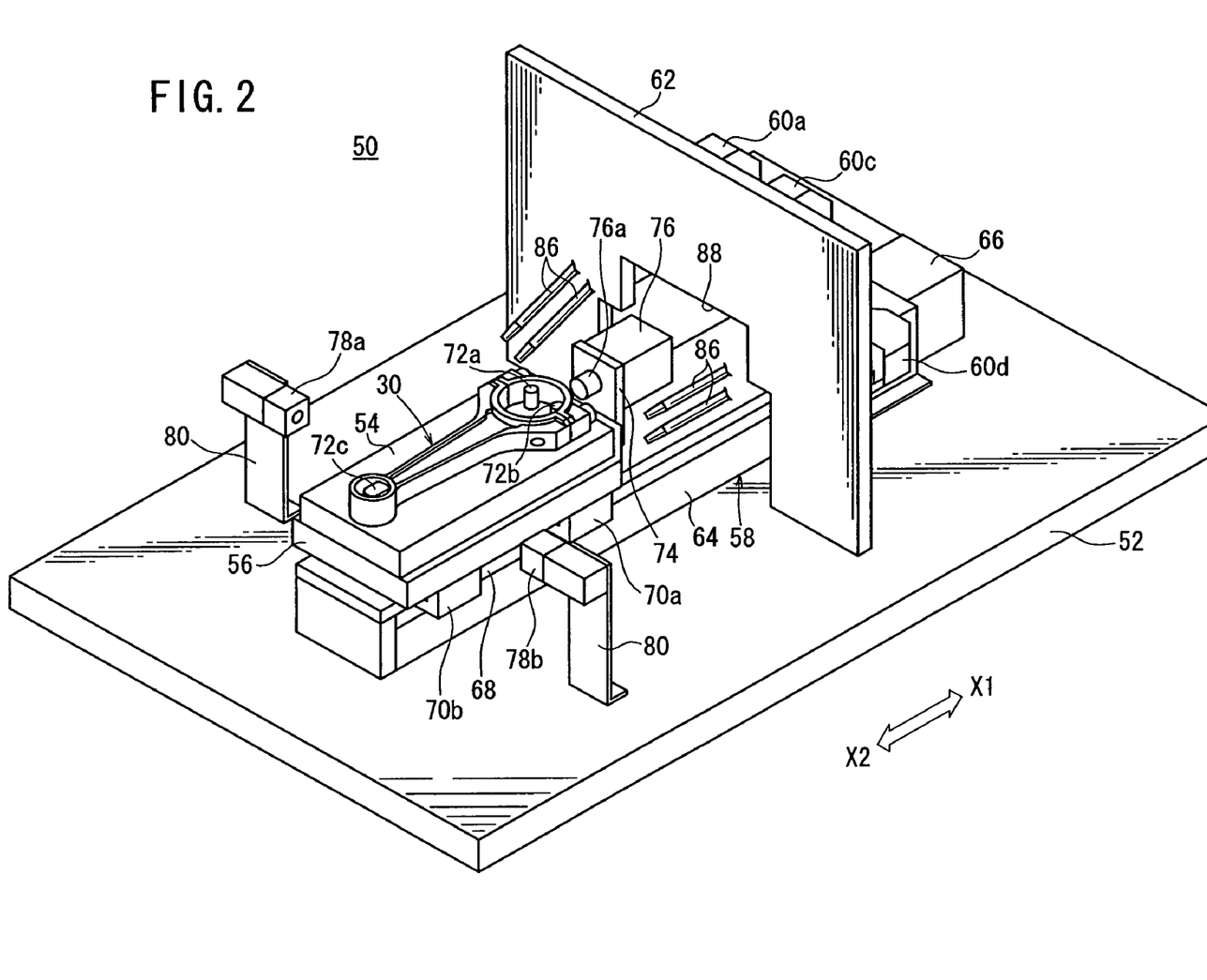
FIG. 2 is a perspective view of a connecting rod inspecting apparatus according to an embodiment of the present invention.
Figure 3:
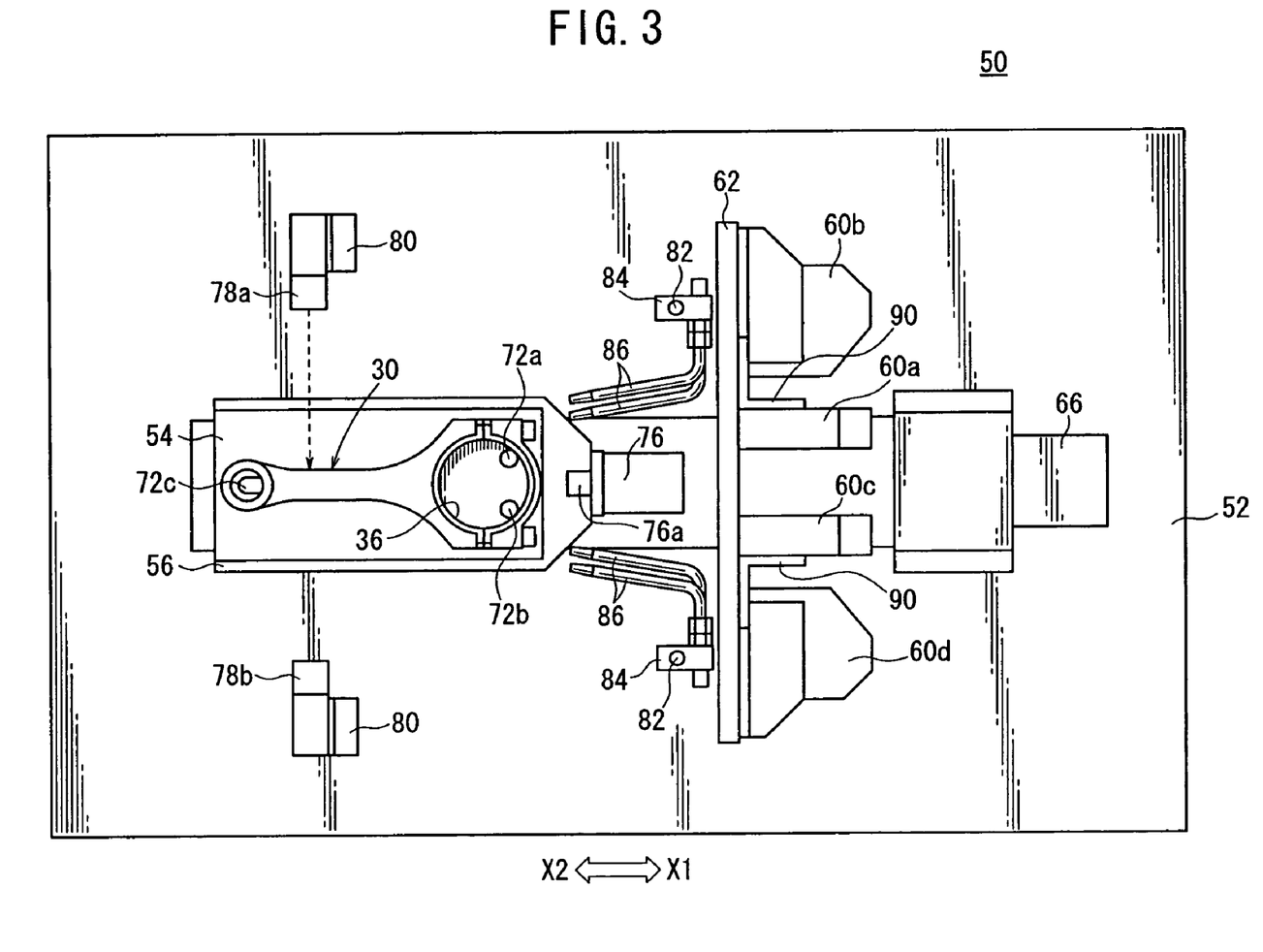
FIG. 3 is a plan view of the connecting rod inspecting apparatus shown in FIG. 2.
Figure 4:
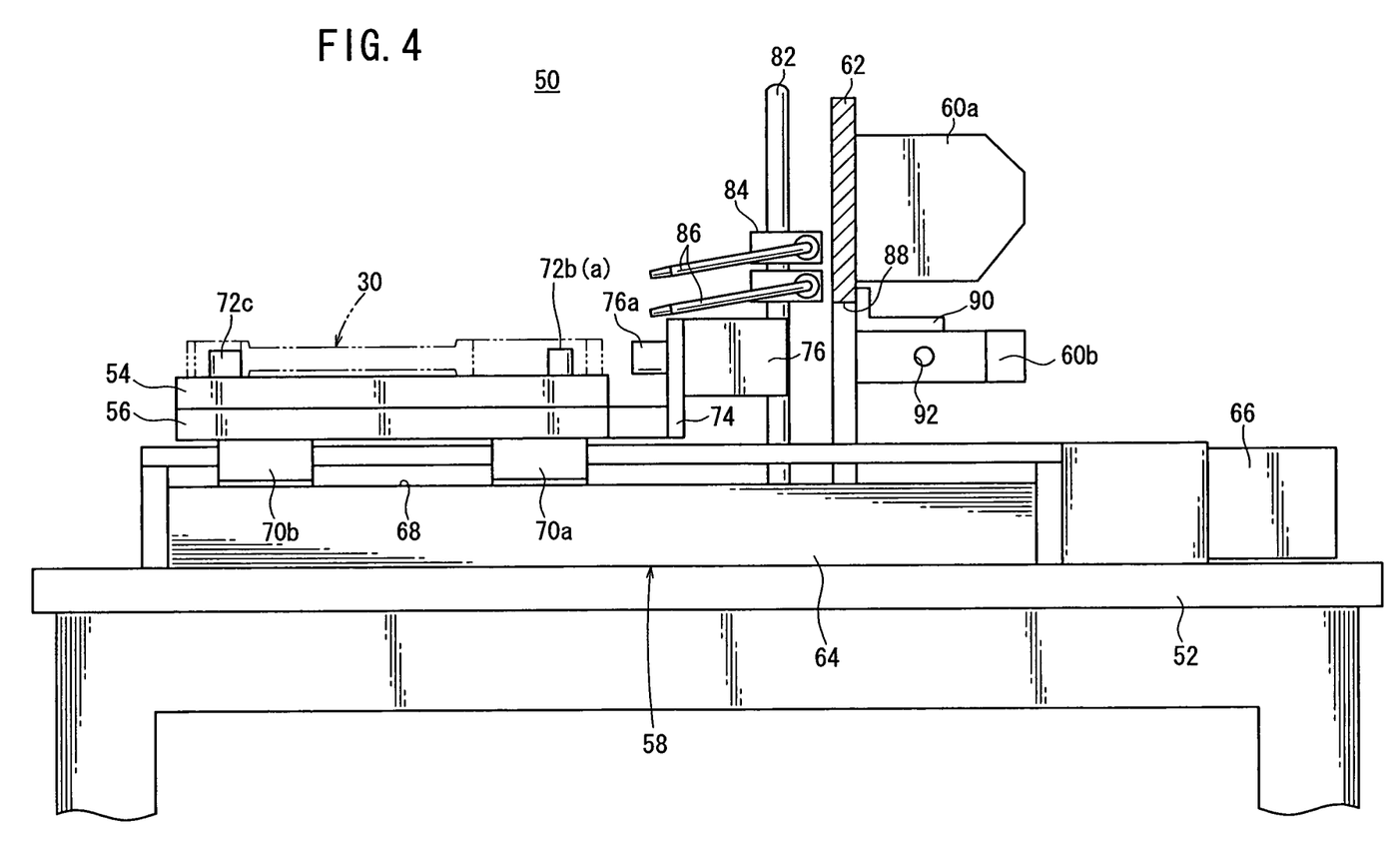
FIG. 4 is a side elevational view, partly in vertical cross section, of the connecting rod inspecting apparatus shown in FIG. 2.
Figure 5:
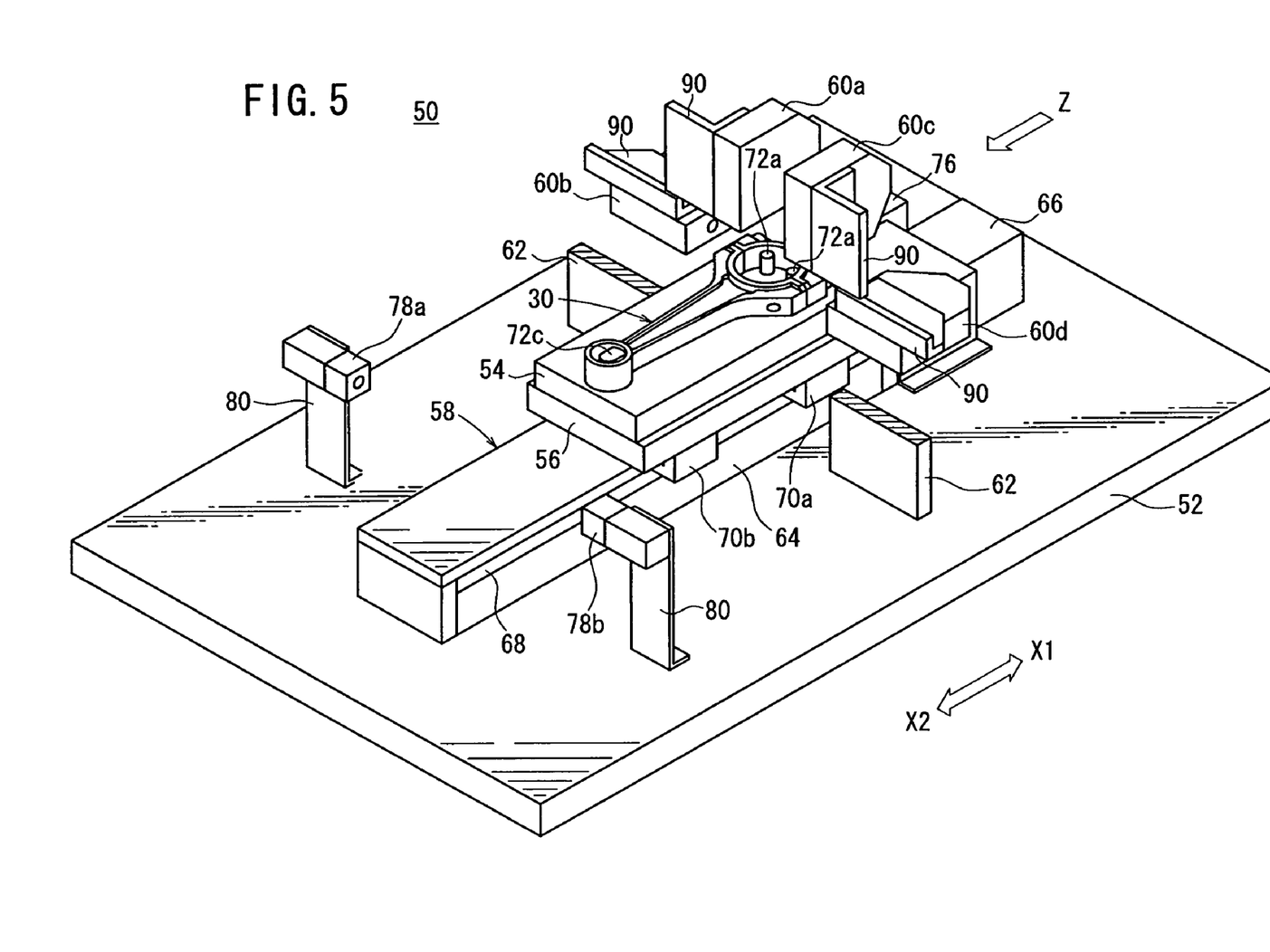
FIG. 5 is a perspective view, partly cut away, of the connecting rod inspecting apparatus shown in FIG. 2.
Figure 6:
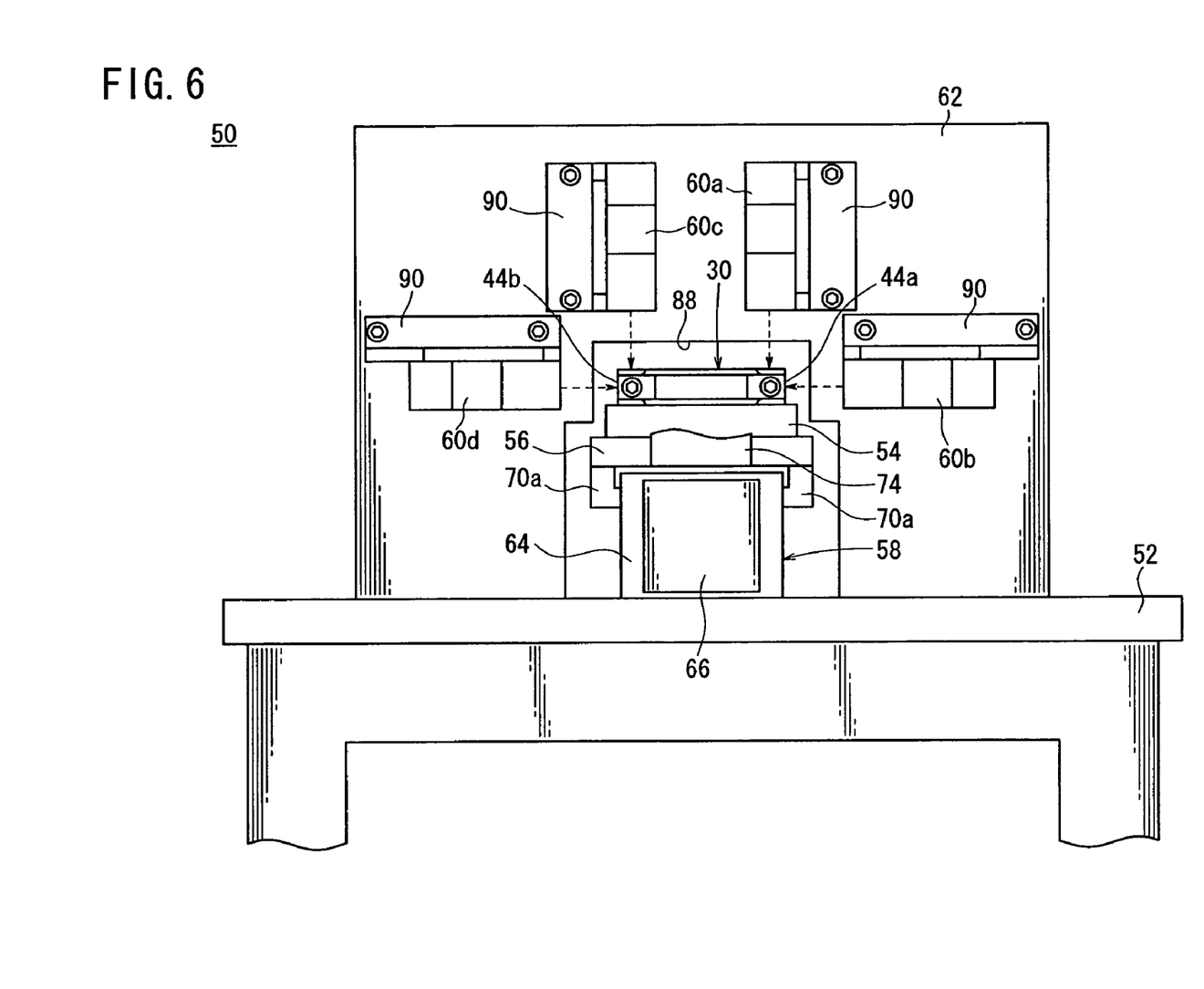
FIG. 6 is an end view of the connecting rod inspecting apparatus as viewed in the direction of the arrow Z in FIG. 5.

A connecting rod inspecting apparatus 50 according to an embodiment of the present invention is illustrated in FIGS. 2 through 6. FIG. 2 shows in perspective the connecting rod inspecting apparatus 50. FIG. 3 shows in plan the connecting rod inspecting apparatus 50. FIG. 4 shows in side elevation, partly in vertical cross section, the connecting rod inspecting apparatus 50. FIG. 5 shows in perspective, partly cut away, the connecting rod inspecting apparatus 50, with a step at the joint being detected by a plurality of distance sensors. FIG. 6 shows the connecting rod inspecting apparatus 50 as viewed in the direction of the arrow Z in FIG. 5.

The connecting rod inspecting apparatus 50 comprises a base 52 in the form of an elongate rectangle as viewed from above, a slide unit 58 for linearly reciprocally moving a workpiece table 54 and a slide table 56 on which the connecting rod 30 as an inspected object is placed, and a support plate 62 mounted vertically on the base 52 and supporting thereon a plurality of first through fourth distance sensors (step extent detecting means) 60a through 60d (see FIG. 6) for measuring a distance up to an area (measured surface) irradiated with a laser beam that is applied to the measured (inspected) surface of the joined areas 44a, 44b of the connecting rod 30.

As shown in FIG. 4, the slide unit 58 includes a unit body 64 in the form of an elongate rectangular parallelepiped, a rotary actuator 66 coupled to an end of the unit body 64, a ball screw shaft (not shown) connected to the drive shaft of the rotary actuator 66 by a coupling member (not shown) for rotation about its own axis upon energization of the rotary actuator 66, and a nut (not shown) threaded over the ball screw shaft for displacement along the axis of the unit body 64.

The slide unit 58 also includes a pair of sliders 70a, 70b extending from a slot 68 defined in a side wall of the unit body 64 and coupled to the nut for displacement in unison with the nut, the slide table 56 coupled to the sliders 70a, 70b for displacement along an upper surface of the unit body 64 in a substantially horizontal direction, and the workpiece table 54 coupled to an upper surface of the slide table 56 for displacement in unison with the slide table 56. As shown in FIG. 4, a certain clearance is provided between the lower surface of the slide table 56 and the upper surface of the unit body 64.

As shown in FIGS. 2 and 3, the workpiece table 54 supports on its upper surface first and second guide pins 72a, 72b for abutting against an inner wall surface of the joint hole 36 in the larger end 38 of the connecting rod 30 when the connecting rod 30 to be inspected is set on the workpiece table 54, and a third guide pin 72c for abutting against an inner wall surface of the hole in the smaller end 40.

A joint plate 74 (see FIG. 4) extending substantially perpendicularly to the upper surface of the slide table 56 is joined to an end face of the slide table 56 near the first and second guide pins 72a, 72b. A cylinder 76 for positioning the connecting rod 30 set on the workpiece table 54 is fixed to the joint plate 74. The cylinder 76 has a piston rod 76a facing the larger end 38 of the connecting rod 30 and lying in substantial horizontal alignment with the connecting rod 30. The cylinder 76 is displaceable in unison with the workpiece table 54 and the slide table 56.

When the connecting rod 30 is placed on the workpiece table 54, air supplied from an air source (not shown) to the cylinder 76 activates the cylinder 76, projecting and retracting the piston rod 76a into hitting engagement with the larger end 38 of the connecting rod 30 to give two successive small impacts thereto. As a result, the connecting rod 30 is pushed axially in a direction away from the cylinder 76, and is positioned in place when the inner wall surface of the joint hole 36 in the larger end 38 and the inner wall surface of the hole in the smaller end 40 abut against the first through third guide pins 72a, 72b, 72c.

As shown in FIGS. 2 and 3, two sensors 78a, 78b, disposed one on each side of the workpiece table 54 and the slide table 56, are mounted on the upper surface of the base 52 by respective support arms 80. The sensors 78a, 78b serve to detect whether the connecting rod 30 is set on the workpiece table 54 or not.

One of the sensors 78a, 78b has an unillustrated light-emitting element and the other sensor has an unillustrated light-detecting element. When a light beam emitted from the light-emitting element is detected by the light-detecting element, it is judged that the connecting rod 30 is not set on the workpiece table 54. When a light beam emitted from the light-emitting element is interrupted as indicated by the broken line in FIG. 3, it is judged that the connecting rod 30 is set on the workpiece table 54.

As shown in FIGS. 3 and 4, a pair of support columns 82 are vertically mounted on the base 52 one on each side of the cylinder 76 near the support plate 62. Each of the support columns 82 supports a plurality of nozzles 86 mounted on engaging members 84 at respective heights. The nozzles 86 have respective nozzle ends bent so as to face the joint areas 44a, 44b of the connecting rod 30. The nozzles 86 eject airflows from the nozzle ends to remove dust particles off the joint areas 44a, 44b.

The nozzles 86 eject airflows when the workpiece table 54 and the slide table 56 approach the support plate 62. The nozzles 86 eject no airflows when the workpiece table 54 and the slide table 56 are displaced away from the support plate 62.

As shown in FIGS. 2 and 6, the support plate 62 has a substantially rectangular opening 88 defined therein for passing therethrough the workpiece table 54 and the slide table 56 when they are linearly displaced along the axis of the unit body 64 by the slide unit 58.

As shown in FIG. 6, the first through fourth distance sensors 60a through 60d are mounted on a wall surface of the support plate 62 which faces the rotary actuator 66. The first distance sensor 60a serves to apply a laser beam to an upper right surface (as viewed in FIG. 6) of the joint area 44a of the connecting rod 30 to measure a distance from the first distance sensor 60a to the upper right surface of the joint area 44a. The second distance sensor 60b serves to apply a laser beam to a right side surface (as viewed in FIG. 6) of the joint area 44a of the connecting rod 30 to measure a distance from the second distance sensor 60b to the right side surface of the joint area 44a. The third distance sensor 60c serves to apply a laser beam to an upper left surface (as viewed in FIG. 6) of the joint area 44b of the connecting rod 30 to measure a distance from the third distance sensor 60c to the upper left surface of the joint area 44b. The fourth distance sensor 60d serves to apply a laser beam to a left side surface (as viewed in FIG. 6) of the joint area 44b of the connecting rod 30 to measure a distance from the fourth distance sensor 60d to the left side surface of the joint area 44b.

The first through fourth distance sensors 60a through 60d have respective holes 92 (see FIG. 4) defined therein for applying the laser beams respectively therethrough to the joint areas 44a, 44b. The first through fourth distance sensors 60a through 60d are electrically connected to a controller (not shown), and supply respective detected signals to the controller, which determine whether the extent of the step of the connecting rod 30 falls within a predetermined range or not based on the supplied detected signals.

The connecting rod inspecting apparatus 50 according to the embodiment of the present invention is basically constructed as described above. Operation and advantages of the connecting rod inspecting apparatus 50 will be described in detail below.

First, the connecting rod 30 is placed as an inspected object on the upper surface of the workpiece table 54 such that the first and second guide pins 72a, 72b engage the inner wall surface of the joint hole 36 in the larger end 38, and the third guide pin 72c engages the inner wall surface of the hole in the smaller end 40. As described above, the connecting rod 30 to be inspected by the connecting rod inspecting apparatus 50 is integrally produced by casting, forging, or the like, and then fractured into the cap 32 and the rod 34 by a cracking apparatus, not shown (see FIG. 1B). The cracked surfaces of the cap 32 and the rod 34 are then rejoined to each other by the bolts 43a, 43b (see FIG. 1A).

The controller detects when the connecting rod 30 is placed on the workpiece table 54 based on a signal from the sensor 78b which detects no light beam though the sensor 78a emits a light beam toward the sensor 78b.

Then, the positioning cylinder 76 is actuated to extend the piston rod 76a to cause the tip end thereof to hit the end face of the larger end 38 of the connecting rod 30 twice, thus applying small impacts to the connecting rod 30. As a result, the connecting rod 30 is pushed axially away from the cylinder 76 to cause the inner wall surface of the joint hole 36 in the larger end 38 to engage the first and second guide pins 72a, 72b and also to cause the inner wall surface of the hole in the smaller end 40 to engage the third guide pin 72c, whereupon the connecting rod 30 is positioned in place on the workpiece table 54.

Then, the rotary actuator 66 is actuated to rotate the non-illustrated ball screw shaft about its own axis in the unit body 64, forcing the non-illustrated nut threaded on the balls screw shaft to displace the sliders 70a, 70b and hence the slide table 56 and the workpiece table 54 linearly toward the support plate 62 in the direction indicated by the arrow X1. When the connecting rod 30 placed on the workpiece table 54 approaches the support plate 62, the nozzle ends of the nozzle 86 apply air flows to the measured surfaces of the connecting rod 30, thereby removing dust particles off the measured surfaces.

Immediately after the joint areas 44a, 44b of the connecting rod 30 set on the workpiece table 54 are moved through the opening 88 in the support plate 62 by the slide unit 58, the first through fourth distance sensors 60a through 60d simultaneously apply respective laser beams to the joint areas 44a, 44b. Specifically, the first distance sensor 60a applies its laser beam to the upper right surface of the joint area 44a of the connecting rod 30. The second distance sensor 60b applies its laser beam to the right side surface of the joint area 44a of the connecting rod 30. The third distance sensor 60c applies its laser beam to the upper left surface of the joint area 44b of the connecting rod 30. The fourth distance sensor 60d applies its laser beam to the left side surface of the joint area 44b of the connecting rod 30.

Based on reflected beams from the joint areas 44a, 44b that are irradiated with the laser beams emitted by the first through fourth distance sensors 60a through 60d, the first through fourth distance sensors 60a through 60d measure distances therefrom to the measured surfaces of the joint areas 44a, 44b. The first through fourth distance sensors 60a through 60d supply respective detected signals representative of the measured distances to the controller, which determine whether the distances are acceptable or not. If the distance represented by at least one of the detected signals from the first through fourth distance sensors 60a through 60d falls outside of a predetermined range, then the controller judges that the connecting rod 30 is not acceptable. If the distances represented by all the detected signals from the first through fourth distance sensors 60a through 60d fall in the predetermined range, then the controller judges that the connecting rod 30 is acceptable.

After the distances are measured by the first through fourth distance sensors 60a through 60d, the rotary actuator 66 is reversed in rotation to displace the workpiece table 54 and the slide table 56 with the connecting rod 30 placed thereon through the opening 88 in the support plate 62 away from the support plate 62 in the direction indicated by the arrow X2, until the connecting rod 30 returns to its initial position. The above process is repeated to successively inspect a plurality of connecting rods 30.

A process of measuring the extent of the step at each of the joint areas 44a, 44b of the connecting rod 30 will be described in detail below with reference to FIG. 7.

Figure 8:
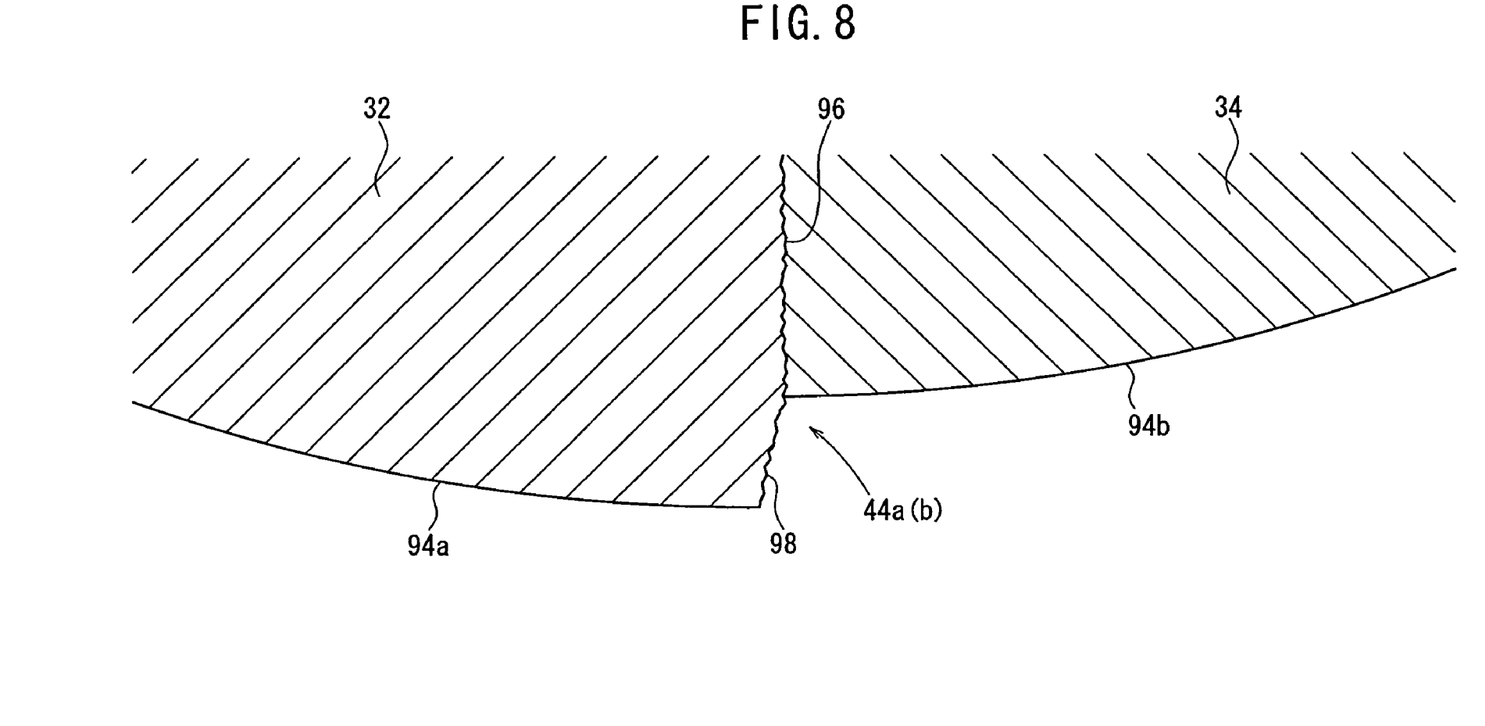
FIG. 8 is an enlarged fragmentary cross-sectional view of the joint area of the connecting rod.

FIG. 8 shows the joint area 44a (44b) of the connecting rod 30 enlarged fragmentary cross section. As shown in FIG. 8, the cap 32 has a measured surface 94a having a curved cross-sectional shape, and the rod 34 has a measured surface 94b having a curved cross-sectional shape. The cap 32 and the rod 34 are connected to each other through a cracked surface 96 including a step 98 between the measured surfaces 94a, 94b.

Figure 7:
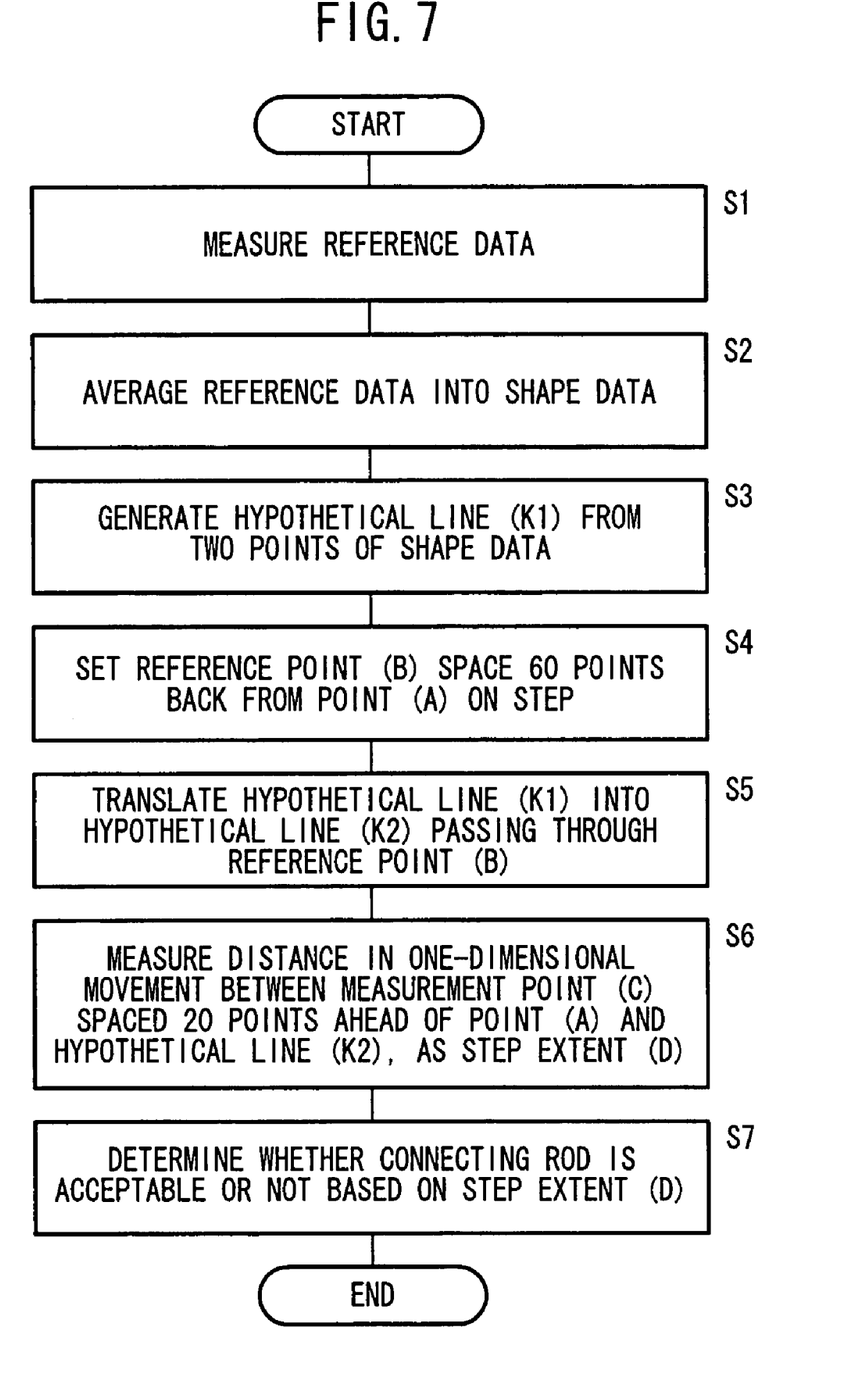
FIG. 7 is a flowchart of a process of measuring the extent of a step in the joint area of the connecting rod.

Initially, reference data of the connecting rod 30 is measured in step S1 shown in FIG. 7. The reference data is measured at a plurality of points, i.e., 829 points, in a range (measurement range) covering a straight line, which is 8 mm long, in the axial direction of the connecting rod 30 near the joint area 44a (44b) of the connecting rod 30.

The measurement range includes a cracked range of ±2 mm plus distances of 2 mm on both ends of the cracked range, totaling 8 mm, produced when the connecting rod 30 is cracked.

Then, averaged shape data is generated from the measured reference data in step S2. Specifically, in order to reduce the effect of the surface roughness of the measured surfaces 94a, 94b, the data of every 30 points of the reference data made up of 1st through 829th points are averaged into shape data of one point.

For example, 1st point of the shape data represents an average of 1st through 30th points (1-30) of the reference data, 2nd point of the shape data represents an average of 2nd through 31st points (2-31) of the reference data, and 3rd point of the shape data represents an average of 3rd through 32nd points (3-32) of the reference data. Similarly, 360th point of the shape data represents an average of 360th through 389th points (360-389) of the reference data, and 800th point of the shape data represents an average of 800th through 829th points (800-829) of the reference data. In this manner, averaged shape data 1 through 800 are obtained.

Figure 9:
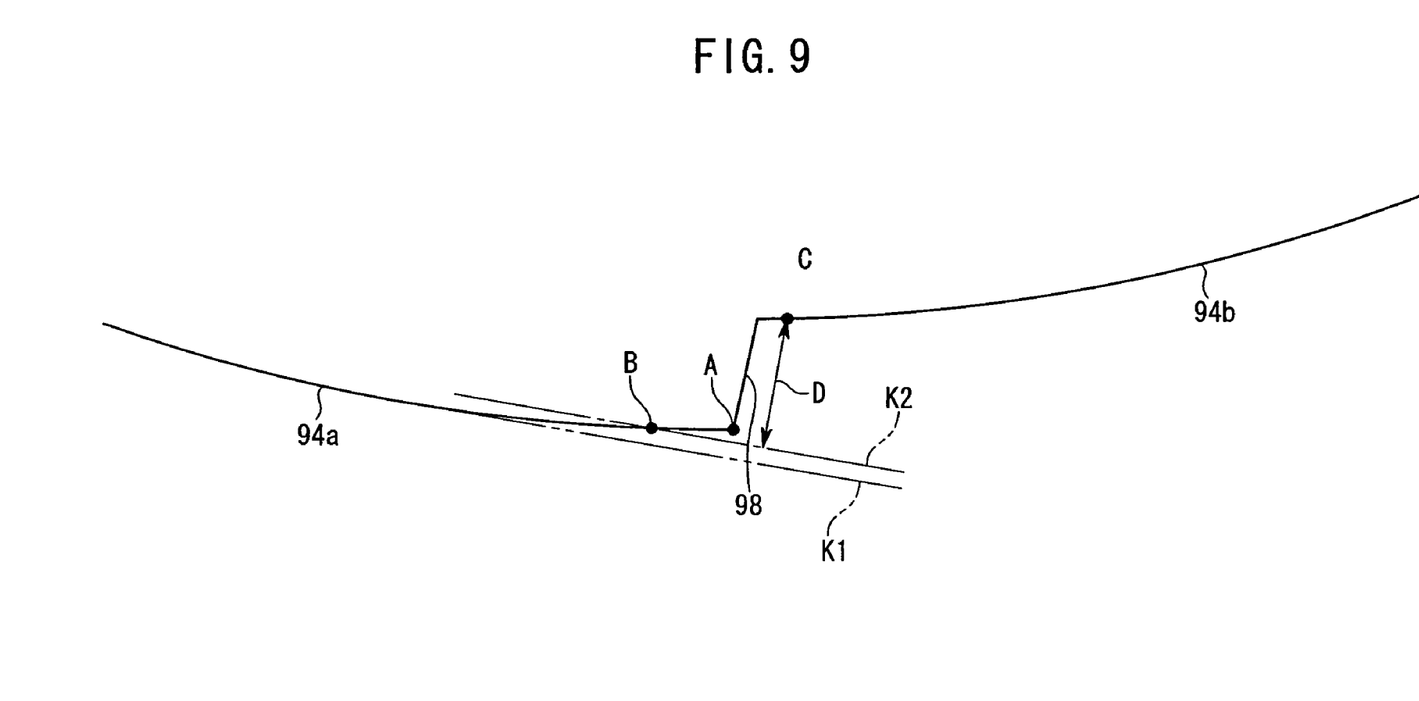
FIG. 9 is a diagram representing a sequence of setting a hypothetical line K1 with respect to a curved measured surface, offsetting the hypothetical line K1 into a hypothetical line K2, and measuring the extent of a step based on the distance that the hypothetical line K2 moves to a measured point.

Then, as shown in FIG. 9, a hypothetical line K1 in the form of a straight line is generated based on the data of two points, i.e., 20th point and 360th point, of the shape data. The 20th point and the 360th point have been determined through experimentation. Since the measured surfaces 94a, 94b have curved cross-sectional shapes (curved surfaces), respectively, the hypothetical line (reference line) K1 is established as a reference with respect to the measured surfaces 94a, 94b for accurate measurement.

The hypothetical line K1 should be generated based on the data prior to the step (cracked surface) 98 in a small range (of points). The same hypothetical line K1 is used for connecting rods 30 of the same type (shape), and other hypothetical lines are used for connecting rods 30 of other shapes.

After the hypothetical line K1 is generated, a point A on the step (cracked surface) 98 is detected based on the shape data, and a point which is spaced 60 points back from the detected point A on the step 98 is set as a reference point B in step S4. The 60 points have been determined through experimentation.

Then, as shown in FIG. 9, the hypothetical line K1 is translated (offset) one-dimensionally to the reference point B, and a straight line passing through the reference point B is set as a hypothetical line K2 in step S5. In this manner, the extent D of the step 98 can accurately be measured by not having the hypothetical line K2 pass through the point A on the step 98 and by offsetting the hypothetical line K2 as a straight line passing through the reference point B.

The reasons for the hypothetical line K2 passing through the reference point B are as follows: The cracked surfaces (point A) of the cap 32 and the rod 34 may include surface irregularities which do not adversely affect the rejoining of the cap 32 and the rod 34. For example, minute chips, surface bucklings, burrs, etc. may be trapped between the cap 32 and the rod 34, forming surface irregularities. The extent D of the step 98 can accurately be measured at the reference point B near the cracked surfaces of the cap 32 and the rod 34 because the measurement is not affected by the surface irregularities. The reference point B near the cracked surfaces has been established through a lot of experimentation and simulation.

The distance in a one-dimensional direction of movement (translation) between the hypothetical line K2 offset to pass through the reference point B and a measurement point C that is spaced 20 points ahead of the point A detected on the step 98, is measured as the extent D of the step 98 in step S6. The measured extent D of the step 98 is compared with a predetermined allowable range in step S7. If the measured extent D of the step 98 falls in the allowable range, then the connecting rod 30 is judged as being acceptable. If the measured extent D of the step 98 falls outside of the allowable range, then the connecting rod 30 is judged as being unacceptable and is rejected.

The connecting rod 30 is judged based on the data from each of the first through fourth distance sensors 60a through 60d. If the connecting rod 30 is judged as being acceptable based on the data from all the first through fourth distance sensors 60a through 60d, then the connecting rod 30 is judged as an adequate product. If the connecting rod 30 is judged as being unacceptable based on the data from either one of the first through fourth distance sensors 60a through 60d, then the connecting rod 30 is judged as an inadequate product.

As described above, the extent D of the step 98 provided by the curved measured surfaces 94a, 94b in the joint areas 44a, 44b of the connecting rod 30 is accurately measured, and the connecting rod 30 is judged based on the measured extent D of the step 98.

It is the most preferable to judge the connecting rod 30 based on the data from the first through fourth distance sensors 60a through 60d with respect to the four locations of the connecting rod 30, i.e., the left and right side surfaces and the left and right upper surfaces of the joint areas 44a, 44b. However, the connecting rod 30 may be judged on the basis of data with respect to two locations of the connecting rod 30, i.e., the left and right side surfaces of the joint areas 44a, 44b, which tend to shrink and expand greatly due to residual stresses generated when the connecting rod 30 is cracked.

Figure 10:
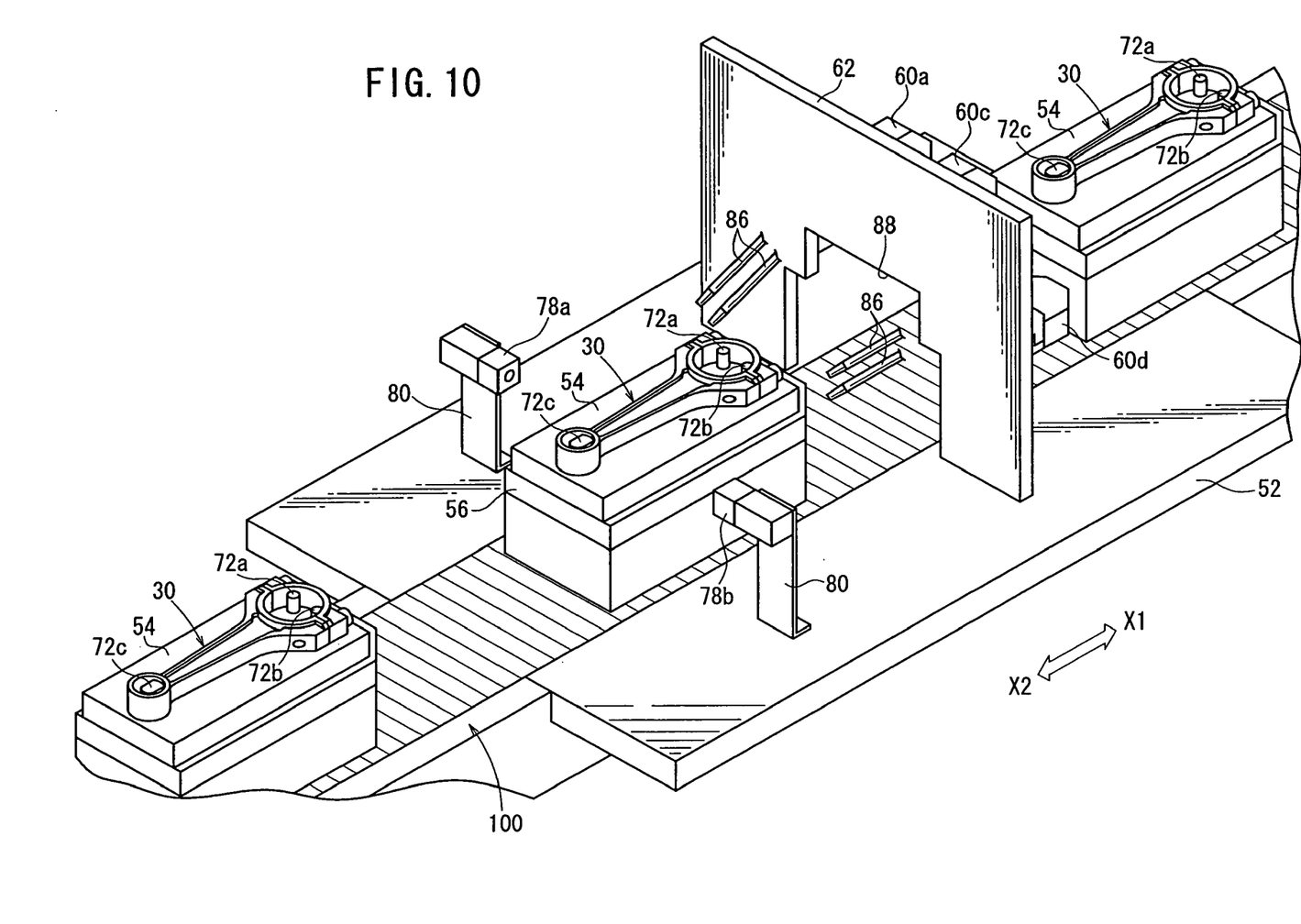
FIG. 10 is a perspective view of a system for determining whether a plurality of inspected workpieces, i.e., connecting rods, are acceptable or not while they are successively transported on a plurality of slide tables and workpiece tables along a linear track mechanism.

In the illustrated embodiment, the slide table 56 and the workpiece table 54 are linearly reciprocally moved through the sliders 70a, 70b for inspecting the connecting rod 30 mounted on the workpiece table 54. However, as shown in FIG. 10, a plurality of slide tables 56 and a plurality of workpiece tables 54 with connecting rods 30 placed respectively thereon may be successively moved along a linear track mechanism 100 for successively judging the connecting rods 30. The linear track mechanism 100 may be movable selectively in the direction indicated by the arrow X1 and the direction indicated by the arrow X2 by a feed means such as a conveyor or the like (not shown).

The invention claimed is:

1. An apparatus for inspecting a connecting rod by cracking a larger end of the connecting rod into a cap and a rod, rejoining the cap and the rod, and thereafter checking a step in a joint area between the cap and the rod, comprising:
    a workpiece table for placing the connecting rod positioned in place thereon;
    a slide unit for reciprocally moving said workpiece table in a horizontal direction; and
    a step extent detecting mechanism for detecting an extent (D) of said step by applying a laser beam to a curved measured surface of the connecting rod and measuring a distance up to the curved measured surface.

2. An apparatus according to claim 1, wherein said step extent detecting mechanism comprises:
    a first distance sensor for applying a laser beam to an upper right surface of said joint area;
    a second distance sensor for applying a laser beam to a right side surface of said joint area;
    a third distance sensor for applying a laser beam to an upper left surface of said joint area; and
    a fourth distance sensor for applying a laser beam to a left side surface of said joint area.

3. An apparatus according to claim 1, wherein said step extent detecting mechanism comprises:

a distance sensor for applying a laser beam to a right side surface of said joint area; and a distance sensor for applying a laser beam to a left side surface of said joint area.

4. An apparatus according to claim 1, wherein said workpiece table comprises:

a first guide pin and a second guide pin for engaging in a joint hole in the larger end of the connecting rod; and a third guide pin for engaging in a hole in a smaller end of the connecting rod;

wherein the connecting rod is positioned in place by said first guide pin, said second guide pin, and said third guide pin when the connecting rod is placed on said workpiece table.

5. An apparatus according to claim 1, further comprising a pair of sensors for detecting whether the connecting rod is set on said workpiece table or not.

6. An apparatus for inspecting a connecting rod by cracking a larger end of the connecting rod into a cap and a rod, rejoining the cap and the rod, and thereafter checking a step in a joint area between the cap and the rod, comprising:

a workpiece table for placing the connecting rod positioned in place thereon;

a slide unit for reciprocally moving said workpiece table in a horizontal direction; and a plurality of distance sensors for detecting an extent (D) of said step by applying a laser beam to a curved measured surface of the connecting rod and measuring a distance up to the curved measured surface;

wherein said distance sensors apply a laser beam to an inspected surface including said joint area of the connecting rod to measure a distance up to the inspected surface which is irradiated with said laser beam, a measurement range of said curved inspected surface is divided into a plurality of points and reference data is measured at said points, said reference data is averaged into shape data, thereafter a hypothetical line (K1) is established by a plurality of points extracted from said shape data, a point spaced a predetermined distance back from a point (A) where said step is detected is established as a reference point (B), said hypothetical line (K1) is translated into a hypothetical line (K2) passing through said reference point (B), a point spaced a predetermined distance ahead of said point (A) where said step is detected is established as a measurement point (C), and the distance in a one-dimensional direction of movement between said hypothetical line (K2) and said measurement point (C) is measured as the extent (D) of said step.

7. A method of inspecting a connecting rod by cracking a larger end of the connecting rod into a cap and a rod, rejoining the cap and the rod, and thereafter checking a step in a joint area between the cap and the rod, comprising the steps of:

applying a laser beam to an inspected surface including said joint area of the connecting rod to measure a distance up to the inspected surface which is irradiated with said laser beam;

dividing said curved inspected surface into a plurality of points and measuring reference data at said points;

averaging said reference data into shape data;

establishing a hypothetical line (K1) with a plurality of points extracted from said shape data;

establishing a point spaced a predetermined distance back from a point (A) where said step is detected, as a reference point (B), and translating said hypothetical line (K1) into a hypothetical line (K2) passing through said reference point (B);

establishing a point spaced a predetermined distance ahead of said point (A) where said step is detected, as a measurement point (C), and measuring the distance in a one-dimensional direction of movement between said hypothetical line (K2) and said measurement point (C) as an extent (D) of said step; and judging the connecting rod for acceptability based on whether said measured extent (D) of said step falls in a predetermined range or not.

8. A method according to claim 7, wherein said hypothetical line (K1) is established by a line segment interconnecting two points extracted from a measurement range prior to said point (A) where said step is detected.

* * * * *